(12) United States Patent
Kuwayama et al.

(10) Patent No.: US 12,422,080 B2
(45) Date of Patent: Sep. 23, 2025

(54) ELBOW PIPE JOINT

(71) Applicant: TOYODA GOSEI CO., LTD., Kiyosu (JP)

(72) Inventors: Kenta Kuwayama, Aichi-ken (JP);
Masayuki Miyamura, Aichi-ken (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 53 days.

(21) Appl. No.: 18/509,792

(22) Filed: Nov. 15, 2023

(65) Prior Publication Data
US 2024/0167603 A1    May 23, 2024

(30) Foreign Application Priority Data

Nov. 18, 2022   (JP) .................................. 2022-184532

(51) Int. Cl.
*F16L 37/40*   (2006.01)
*F16L 37/14*   (2006.01)

(52) U.S. Cl.
CPC ............. *F16L 37/40* (2013.01); *F16L 37/144* (2013.01)

(58) Field of Classification Search
CPC . F16L 37/32; F16L 37/40; F16L 29/04; F16L 29/02; F16L 37/144
See application file for complete search history.

(56) References Cited

U.S. PATENT DOCUMENTS

| | | | | |
|---|---|---|---|---|
| 1,800,045 A | * | 4/1931 | Bates ...................... | F16L 37/38 251/89.5 |
| 1,817,830 A | * | 8/1931 | McJannet ............. | F16L 37/248 239/579 |
| 2,300,483 A | * | 11/1942 | Berger ................... | F16L 29/04 137/614.04 |

(Continued)

FOREIGN PATENT DOCUMENTS

| | | | | |
|---|---|---|---|---|
| CN | 114215987 A | * | 3/2022 | |
| DE | 202007017181 U1 | * | 4/2008 | ............... F01P 7/14 |

(Continued)

OTHER PUBLICATIONS

Office Action dated Apr. 22, 2025 issued for the corresponding Japanese Patent Application No. 2022-184532 (and English translation).

*Primary Examiner* — David Colon-Morales
(74) *Attorney, Agent, or Firm* — Posz Law Group, PLC (57) ABSTRACT

An elbow pipe joint includes a tubular first pipe connecting portion which allows another joint to be connected, a tubular second pipe connecting portion which has a second central axis intersecting a first central axis of the first pipe connecting portion, a hollow valve accommodating portion which is connected to the first pipe connecting portion and the second pipe connecting portion and which has a valve accommodating space communicating with a first inner hole of the first pipe connecting portion and a second inner hole of the second pipe connecting portion, and a flap valve device accommodated in the valve accommodating portion. The (Continued)

flap valve device is configured to pivot to switch between a valve open state where the first and second inner holes communicate with each other and a valve closed state where the first and second inner holes are blocked from each other.

4 Claims, 10 Drawing Sheets

(56) References Cited

U.S. PATENT DOCUMENTS

| | | | | |
|---|---|---|---|---|
| 2,492,271 | A * | 12/1949 | Cox | F16K 15/03 |
| | | | | 251/303 |
| 3,672,630 | A * | 6/1972 | Naumburg | F16K 1/2014 |
| | | | | 251/303 |
| 3,704,002 | A * | 11/1972 | Skarzynski | F16L 37/23 |
| | | | | 251/149.6 |
| 4,007,909 | A * | 2/1977 | Buseth | F16L 29/007 |
| | | | | 251/149.6 |
| 4,090,524 | A * | 5/1978 | Allread | F16K 17/40 |
| | | | | 137/68.15 |
| 4,119,111 | A * | 10/1978 | Allread | F16L 29/007 |
| | | | | 251/149.6 |
| 4,289,295 | A * | 9/1981 | Allread | F16L 29/02 |
| | | | | 251/149.2 |
| 5,115,836 | A * | 5/1992 | Carow | B67D 7/3218 |
| | | | | 137/614.04 |
| 5,209,262 | A * | 5/1993 | Carow | F16L 37/148 |
| | | | | 137/614.04 |
| 6,840,277 | B1 * | 1/2005 | Nimberger | F16L 29/04 |
| | | | | 137/68.14 |
| 6,938,636 | B1 * | 9/2005 | Nimberger | F16L 55/1007 |
| | | | | 285/39 |
| 10,093,175 | B2 * | 10/2018 | Kito | B60K 15/04 |
| 10,113,676 | B2 * | 10/2018 | Bush | F16L 21/035 |
| 10,502,350 | B2 * | 12/2019 | Xu | F16L 37/42 |
| 10,507,723 | B2 * | 12/2019 | Hagano | B60K 15/04 |
| 10,605,393 | B2 * | 3/2020 | Mckay | F16L 1/26 |
| 10,626,005 | B2 * | 4/2020 | Hagano | B67D 7/0478 |
| 10,843,554 | B2 * | 11/2020 | Hagano | B60K 15/04 |
| 10,843,555 | B2 * | 11/2020 | Kubo | B60K 15/04 |
| 11,215,305 | B2 * | 1/2022 | Reuter | F16L 43/00 |
| 11,365,840 | B2 * | 6/2022 | Gauthier | F02M 55/004 |
| 11,821,558 | B2 * | 11/2023 | Janik | F16L 37/144 |
| 12,007,055 | B2 * | 6/2024 | Abraham Carabano | |
| | | | | F16L 37/086 |
| 2017/0248262 | A1 * | 8/2017 | Taniguchi | F16L 37/146 |
| 2021/0222782 | A1 | 7/2021 | Okuno et al. | |

FOREIGN PATENT DOCUMENTS

| | | | | |
|---|---|---|---|---|
| GB | | 897257 | A * | 5/1962 |
| GB | | 1160228 | A * | 8/1969 |
| JP | | 2001-259068 | A | 9/2001 |
| JP | | 2019-138380 | A | 8/2019 |
| JP | | 2020-029933 | A | 2/2020 |
| WO | WO-2010009942 | A1 * | 1/2010 | ............ F16L 37/088 |

* cited by examiner

ELBOW PIPE JOINT

CROSS-REFERENCE TO RELATED APPLICATIONS

This application is based on and claims priority under 35 USC 119 from Japanese Patent Application No. 2022-184532 filed on Nov. 18, 2022, the entire content of which is incorporated herein by reference.

TECHNICAL FIELD

The present disclosure relates to an elbow pipe joint.

BACKGROUND ART

As a pipe joint for connecting two pipes, various pipe joints have been proposed in which two pipe joint members called "a plug and a socket", "a male pipe joint member and a female pipe joint member", and the like each have a valve structure therein, and when the joint members are coupled to each other, each valve structure shifts from a closed state to a released state. For example, a pipe joint disclosed in JP2020-029933A has a valve structure called a plunger valve, and when a plug and a socket are coupled to each other, a member in the socket pushes back a tubular outer valve member in the plug in an axial direction, and thus a sealed engagement between the outer valve member in the plug and an inner valve member (plunger) disposed in the outer valve member is released. Further, in the socket, at the time of coupling, the valve member is pushed back in the axial direction by the inner valve member in the plug, and the sealed engagement between the valve member and the members around the valve member is released. Similarly, a pipe joint disclosed in JP2019-138380A also has a valve structure called a plunger valve.

However, in the pipe joints having a plunger valve as disclosed in JP2020-029933A and JP2019-138380A, since a valve open state and a valve closed state are switched by stroking a valve member (valve body) accommodated therein in an axial direction, a structure long in the axial direction has to be adopted in order to secure a predetermined stroke length. Therefore, there is a problem that the pipe joint cannot be used, for example, in an environment in which a predetermined stroke length cannot be secured in a narrow space such as an engine room of a vehicle. Therefore, a pipe joint capable of implementing coupling and removing of joint members associated with opening and closing operations of a valve in a narrow environment is desired.

SUMMARY OF INVENTION

The present disclosure has been made to solve at least a part of the above-described problems, and can be implemented in the following aspects.

(1) According to an aspect of the present disclosure, an elbow pipe joint is provided. The elbow pipe joint includes: a first pipe connecting portion having a tubular shape, and configured to allow another joint to be connected; a second pipe connecting portion having a tubular shape, and having a second central axis intersecting a first central axis of the first pipe connecting portion; a valve accommodating portion having a hollow shape, connected to the first pipe connecting portion and the second pipe connecting portion, and having a valve accommodating space that communicates with a first inner hole of the first pipe connecting portion and a second inner hole of the second pipe connecting portion; and a flap valve device accommodated in the valve accommodating portion, and configured to pivot to switch between a valve open state in which the first inner hole and the second inner hole communicate with each other and a valve closed state in which the first inner hole and the second inner hole are blocked from each other.

The elbow pipe joint of the aspect includes the first pipe connecting portion and the second pipe connecting portion which have central axes (a first central axis and a second central axis) intersecting each other, the valve accommodating portion, and the flap valve device accommodated in the valve accommodating portion and pivoting to switch between the valve open state and the valve closed state. Therefore, even in a situation where only a narrow space can be secured in a direction along the first central axis and a direction along the second central axis, it is possible to implement opening and closing operations of the valve (the flap valve device). Therefore, it is possible to implement coupling and removing of the joint members (the elbow pipe joint and the another joint) associated with the opening and closing operations of the valve, even in a narrow environment. In addition, since the first inner hole and the second inner hole can, in the valve open state, communicate with each other in a shorter distance in the valve accommodating space than in a plunger valve, it is possible to reduce the flow path resistance (pressure loss).

(2) In the elbow pipe joint in the above aspect, the flap valve device may include: a valve seat member having a bottomed tubular shape, including a bottom portion in which an opening is formed, and having a central axis parallel to the first central axis, the bottom portion being disposed to be in contact with the valve accommodating space; a valve body configured to pivot about a rotation axis orthogonal to both the first central axis and the second central axis, the valve body implementing the valve closed state by sealing the opening, and implementing the valve open state by opening the opening; and an elastic member configured to urge the valve body to seal the opening.

According to the elbow pipe joint of the aspect, the flap valve device includes the valve seat member having the bottomed tubular shape and including the bottom portion in which the opening is formed, the valve body, and the elastic member. Therefore, the valve body is urged by the elastic member to seal the opening in a state in which the another joint is not connected to the elbow pipe joint, thereby implementing the valve closed state, and on the other hand, the valve body pivots to open the opening in a state in which the another joint is connected to the elbow pipe joint, thereby implementing the valve open state.

(3) In the elbow pipe joint of the above aspect, the valve body may include a pressing portion exposed to an inner space of the valve seat member, which communicates with the first inner hole in the valve closed state, the pressing portion being pressed in a direction parallel to the first central axis by the another joint inserted into the first inner hole and connected to the first pipe connecting portion, and the pressing portion is provided on the valve body at a side closer to the rotation axis in a direction parallel to the second central axis.

According to the elbow pipe joint of the aspect, the pressing portion is provided on the valve body at the side closer to the rotation axis of the valve body, at the time of pivoting, in the direction parallel to the second central axis. Therefore, the valve body can be pivoted at a larger angle when the pressing portion is pressed by the another joint by the same length along the first central axis, as compared with a configuration in which the pressing portion is provided on a side far from the rotation axis. Accordingly, a flow path cross-sectional area in the valve accommodating space can be further increased, and it is possible to further reduce a pressure loss.

(4) In the elbow pipe joint of the above aspect, the opening may be formed in the bottom portion such that a third central axis of the opening is parallel to the first central axis, and is positioned farther from the rotation axis along the direction parallel to the second central axis than the first central axis.

According to the elbow pipe joint of the aspect, the opening is formed in the bottom portion of the valve seat member such that the third central axis of the opening is parallel to the first central axis, and is positioned on a side farther from the rotation axis along the direction parallel to the second central axis than the first central axis. Therefore, it is possible to press the pressing portion provided on the valve body at the side closer to the rotation axis in the direction along the second central axis, with higher accuracy, in a configuration that the another joint is connected with the central axis thereof coincides with the first central axis, and presses the pressing portion with a portion on the central axis of the another joint when the another joint is connected to the first pipe connecting portion.

(5) In the elbow pipe joint of the above aspect, the valve body may further include: a main body portion including an exposed surface exposed to the inner space in the valve closed state, and a seal portion being continuous with the exposed surface and configured to seal the opening in the valve closed state; and a protruding portion having a rod shape, protruding from the exposed surface, and being continuous with the pressing portion at a tip end of the protruding portion.

According to the elbow pipe joint of the aspect, the valve body includes the protruding portion having the rod shape, protruding from the exposed surface, and being continuous with the pressing portion at the tip end of the protruding portion. Therefore, when the another joint is connected to the first pipe connecting portion, it is possible to prevent a portion of the valve body different from the pressing portion from being pressed.

(6) In the elbow pipe joint of the above aspect, the protruding portion may be disposed parallel to the first central axis in the valve open state.

According to the elbow pipe joint of the aspect, since the protruding portion is disposed parallel to the first central axis in the valve open state, it is possible to reduce an area of the protruding portion when viewed in the direction of the first central axis. Therefore, it is possible to reduce a pressure loss of a fluid when the fluid flows into the valve accommodating space from the first inner hole.

(7) In the elbow pipe joint of the above aspect, a contact surface, which is configured to come into contact with the another joint, of the pressing portion may have a curve which is a set of involute curves.

According to the elbow pipe joint of this aspect, the contact surface, which comes into contact with the another joint, of the pressing portion has a curve which is a set of involute curves. In a configuration that a contact surface of the another joint that comes into contact with the pressing portion has a curve which is a set of involute curves or a part of a spherical surface, it is possible to prevent a contact position between the another joint and the pressing portion form being excessively displaced. Since the contact portion can be a point or a line, it is possible to stably transmit a pressing force to the valve body at the time of connection of the another joint. Therefore, the valve body can be smoothly pivoted, and it is possible to pivot the valve body with a small force.

BRIEF DESCRIPTION OF DRAWINGS

Exemplary embodiment(s) of the present invention will be described in detail based on the following figures, wherein.

DESCRIPTION OF EMBODIMENTS

A. Embodiment

A1. Overall Device Configuration

Figure 1:
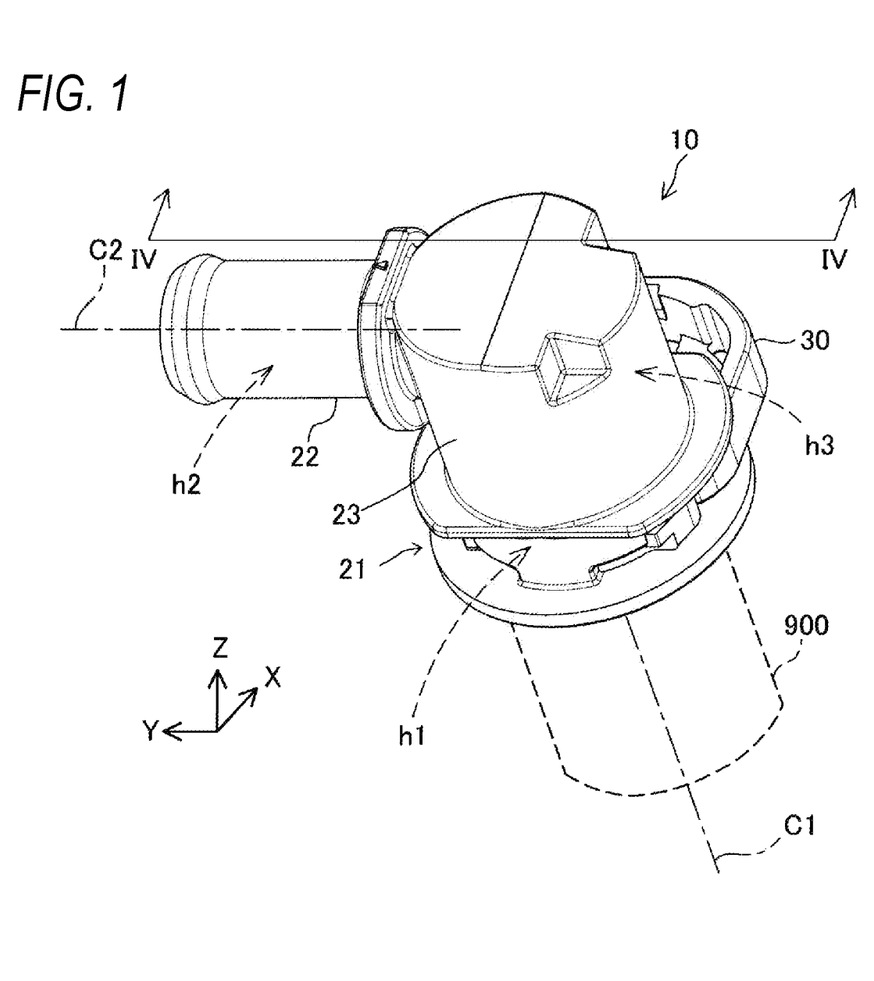
FIG. 1 is a perspective view showing an external configuration of an elbow pipe joint as an embodiment of the present disclosure.
Figure 2:
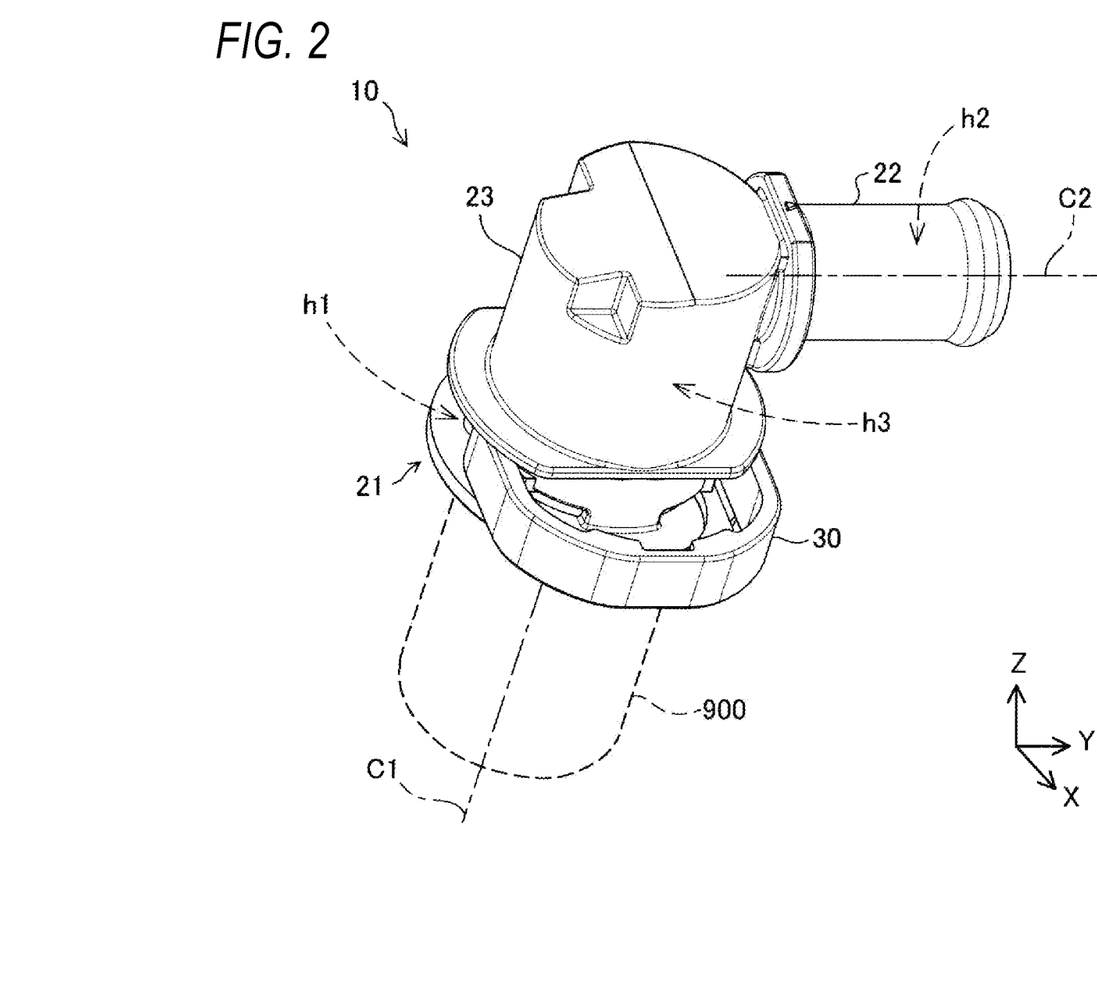
FIG. 2 is a perspective view showing an external configuration of the elbow pipe joint as the embodiment of the present disclosure.
Figure 3:
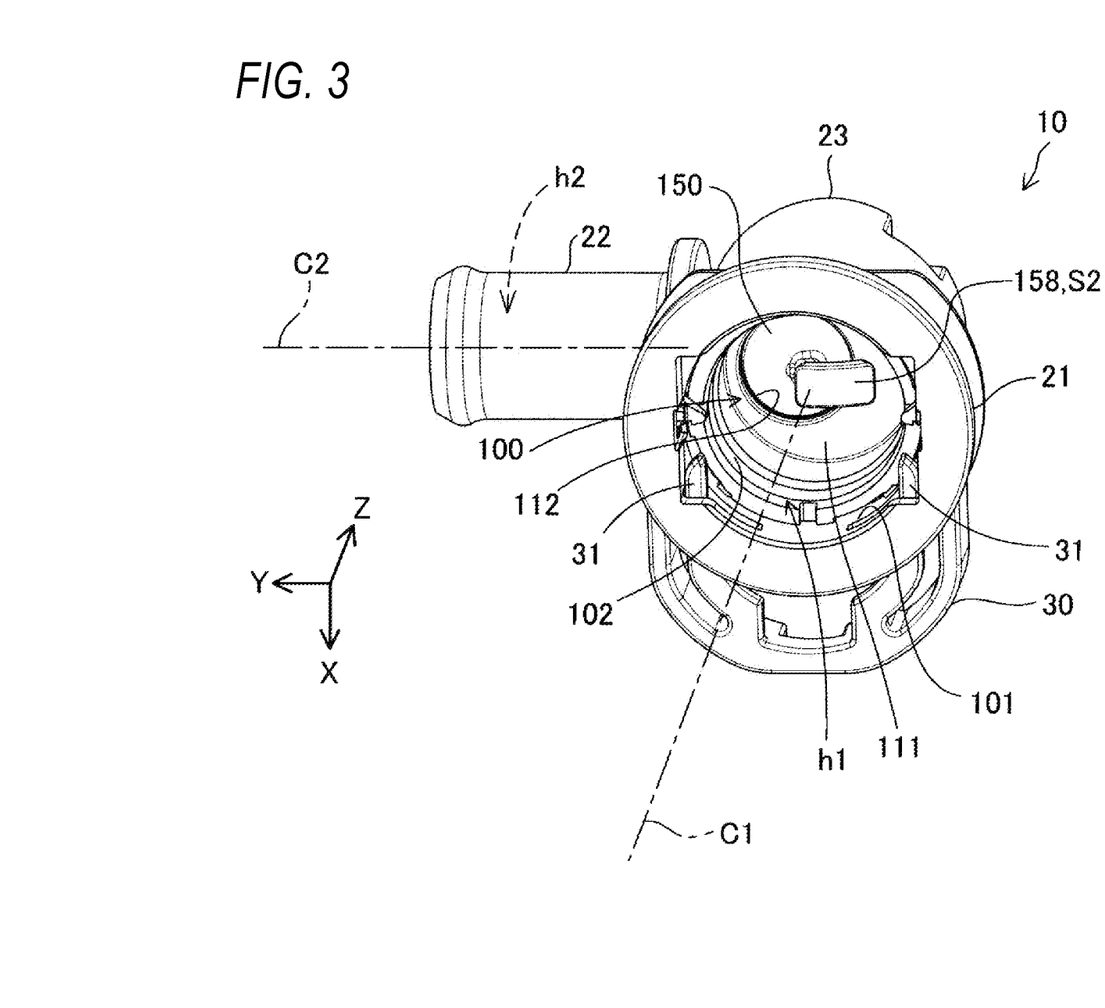
FIG. 3 is a perspective view showing an external configuration of the elbow pipe joint as the embodiment of the present disclosure.

FIGS. 1 to 3 are perspective views showing an external configuration of an elbow pipe joint 10 as an embodiment of the present disclosure. The elbow pipe joint 10 is used to connect two pipes in a narrow space. Specifically, the elbow pipe joint 10 is used to connect the two pipes in a state in which central axes of the two pipes do not coincide with each other (that is, in a state in which the two pipes intersect each other at a predetermined angle). In the present embodiment, the "predetermined angle" is 90 degrees. The angle is not limited to 90 degrees and may be any angle other than 0 degree. In the present embodiment, the "two pipes" correspond to pipes allowing circulating of a cooling medium for adjusting a temperature of a battery module, for example, pure water, a long-life coolant (LLC), air, and oil, in a battery pack which is mounted on a vehicle and in which a plurality of batteries are accommodated in a case. In the present embodiment, one of the two pipes connected to the elbow pipe joint 10 is a tubular joint and presses a part of a flap valve device 100 (to be described later) of the elbow pipe joint 10 when the pipe is connected to the elbow pipe joint 10. In FIGS. 1 and 2, another joint 900 (hereinafter, simply referred to as "joint 900") corresponding to one of the two pipes is indicated by a broken line. The joint 900 is provided in the case of the battery pack and is connected to the elbow pipe joint 10 attached to a surface of the case of the battery pack. In FIGS. 1 to 3, the joint 900 is omitted for convenience of illustration. The elbow pipe joint 10 is not limited to being used for the pipes allowing circulation of a temperature adjustment medium in the battery pack described above, and may be used to connect pipes (and joints) used at any location and allowing circulation of a medium of any type.

In FIGS. 1 to 3, three axes (X, Y, and Z axes) orthogonal to one another are illustrated. In the present embodiment, an "X-axis direction" is a generic term for +X direction and −X direction. Similarly, "Y-axis direction" is a generic term for +Y direction and −Y direction, and "Z-axis direction" is a generic term for +Z direction and −Z direction. The X, Y, and Z axes shown in FIGS. 4 to 10 are the same as the X, Y, and Z axes shown in FIGS. 1 to 3.

As shown in FIGS. 1 to 3, the elbow pipe joint 10 includes a first pipe connecting portion 21, a second pipe connecting portion 22, a valve accommodating portion 23, a retainer 30, and a flap valve device 100. The first pipe connecting portion 21, the second pipe connecting portion 22, and the valve accommodating portion 23 are integrally formed.

The first pipe connecting portion 21 has a tubular external shape and can be connected to the joint 900. An inner hole h1 (hereinafter referred to as a "first inner hole h1") of the first pipe connecting portion 21 and a central axis C1 (hereinafter referred to as a "first central axis C1") of the first pipe connecting portion 21 are parallel to the Z axis. The valve accommodating portion 23 is continuous with the first pipe connecting portion 21 in the +Z direction. The joint 900 can be connected to the first pipe connecting portion 21 in the −Z direction. In the present embodiment, the joint 900 is a pipe joint including a valve device therein, and is connected to a pipe (not shown) at an end portion on a side opposite to a side connected to the elbow pipe joint 10. As shown in FIG. 3, an engaging member 101 and a seal member 102 are attached to the first inner hole h1 of the first pipe connecting portion 21.

The second pipe connecting portion 22 has a tubular external shape and can be connected to a pipe which is not shown. An inner hole h2 (hereinafter referred to as a "second inner hole h2") of the second pipe connecting portion 22 and a central axis C2 (hereinafter referred to as a "second central axis C2") of the second pipe connecting portion 22 are parallel to the Y axis. The valve accommodating portion 23 is continuous with the second pipe connecting portion 22 in the −Y direction. A pipe (not shown) can be connected to the second pipe connecting portion 22 in the +Y direction. The pipe that can be connected to the second pipe connecting portion 22 may be a joint including a valve device therein or may be simply a simple pipe having an inner hole.

The valve accommodating portion 23 is continuous with the first pipe connecting portion 21 and the second pipe connecting portion 22 and has a hollow structure having a valve accommodating space h3 that communicates with the first inner hole h1 and the second inner hole h2.

Figure 4:
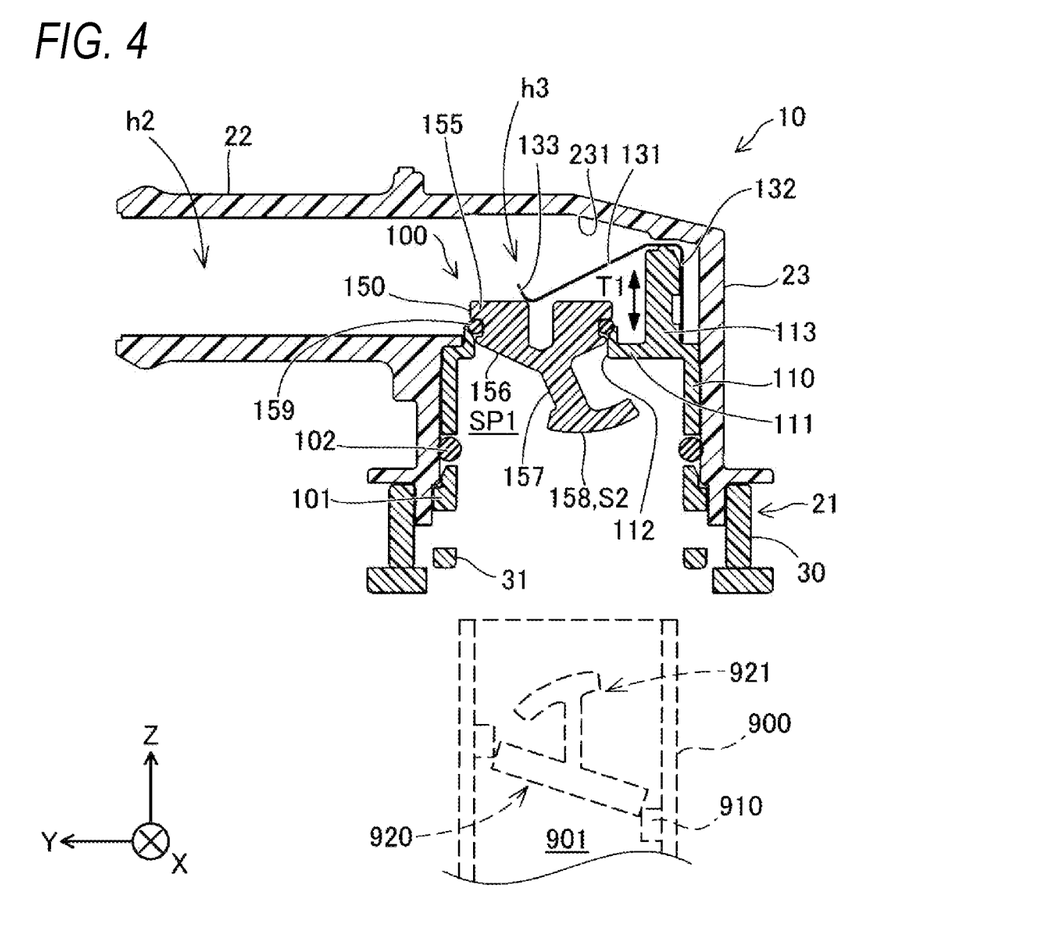
FIG. 4 is a cross-sectional view showing a cross section of the elbow pipe joint.

FIG. 4 is a cross-sectional view showing a cross section of the elbow pipe joint 10. FIG. 4 shows a cross section taken along a line IV-IV in FIG. 1. The flap valve device 100 is accommodated in the valve accommodating space h3. An end portion of the flap valve device 100 in the −Z direction is in contact with the seal member 102. The engaging member 101 is in contact with the seal member 102 in the −Z direction. That is, the seal member 102 is sandwiched between the flap valve device 100 and the engaging member 101 in the Z-axis direction, and seals between the flap valve device 100 and the engaging member 101. FIG. 4 illustrates the elbow pipe joint 10 in a state in which the joint 900 is not connected to the first pipe connecting portion 21, unlike FIGS. 1 to 3. In this state, the flap valve device 100 is in a valve closed state in which the first inner hole h1 and the second inner hole h2 are blocked. A detailed configuration of the flap valve device 100 will be described later. The joint 900 includes, in an inner hole 901, an annular seal portion 910 and a flap valve 920. The flap valve 920 switches, by pivoting similar to the flap valve device 100, between a valve closed state in which an opening of the seal portion 910 is sealed and a valve open state in which the opening of the seal portion 910 is opened. The flap valve 920 includes an abutting portion 921 that protrudes parallel to the central axis of the joint 900 in the valve closed state. A function of the abutting portion 921 will be described later.

As shown in FIGS. 1 to 3, the retainer 30 has a substantially U shape in a plan view. When the joint 900 is connected to the first pipe connecting portion 21, the retainer 30 is attached to sandwich the first pipe connecting portion 21 and engages with a tip end portion of the joint 900. A pair of engaging portions 31 shown in FIGS. 3 and 4 are formed at tip ends of both arm portions of the retainer 30, and the pair of engaging portions 31 are inserted into the first inner hole h1 from openings formed in a side surface of the first pipe connecting portion 21 and engaged with engaging portions (not shown) formed at a tip end of the joint 900. Thus, detachment of the joint 900 from the elbow pipe joint 10 is prevented.

A2. Detailed Configuration of Flap Valve Device 100

Figure 5:
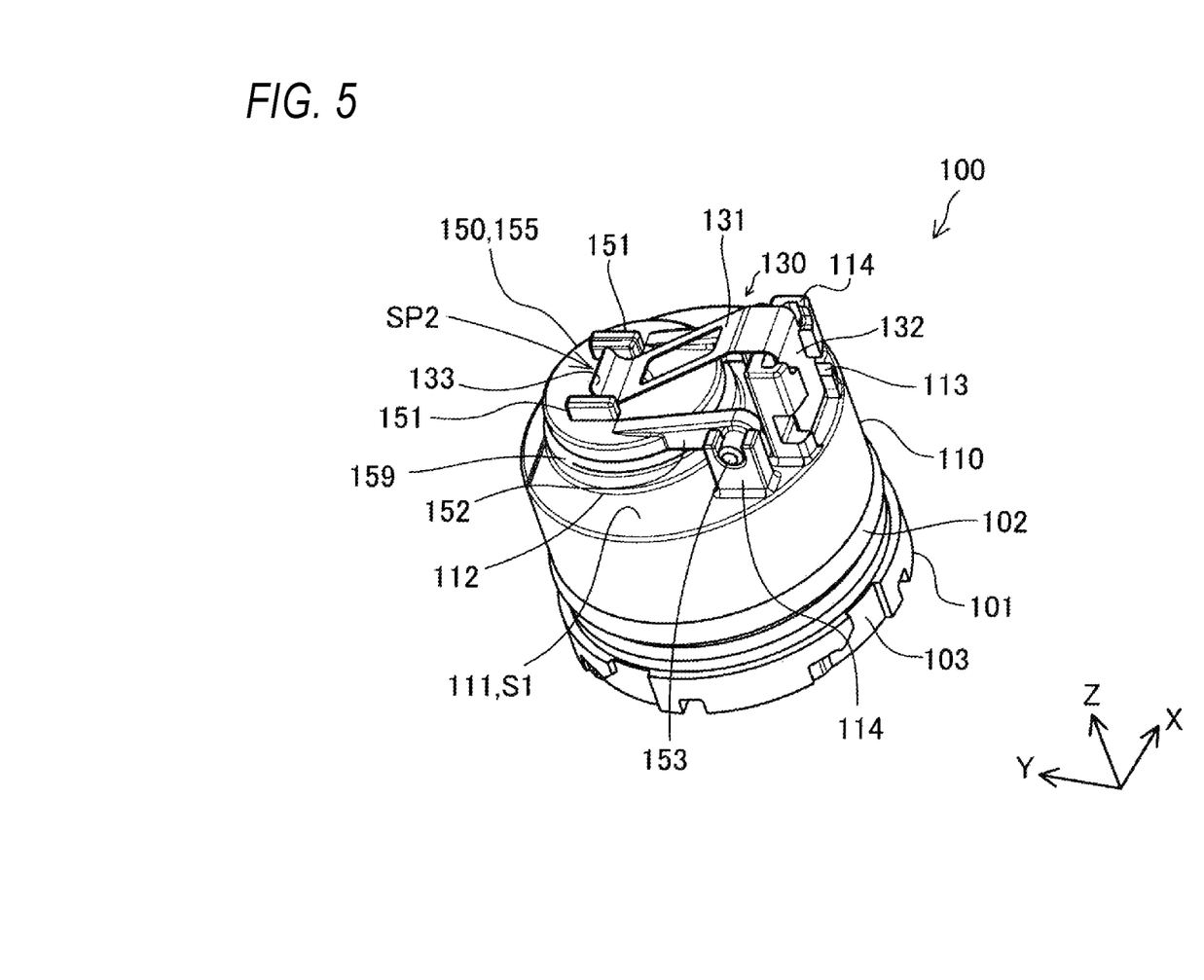
FIG. 5 is a perspective view showing a detailed configuration of a flap valve device.
Figure 6:
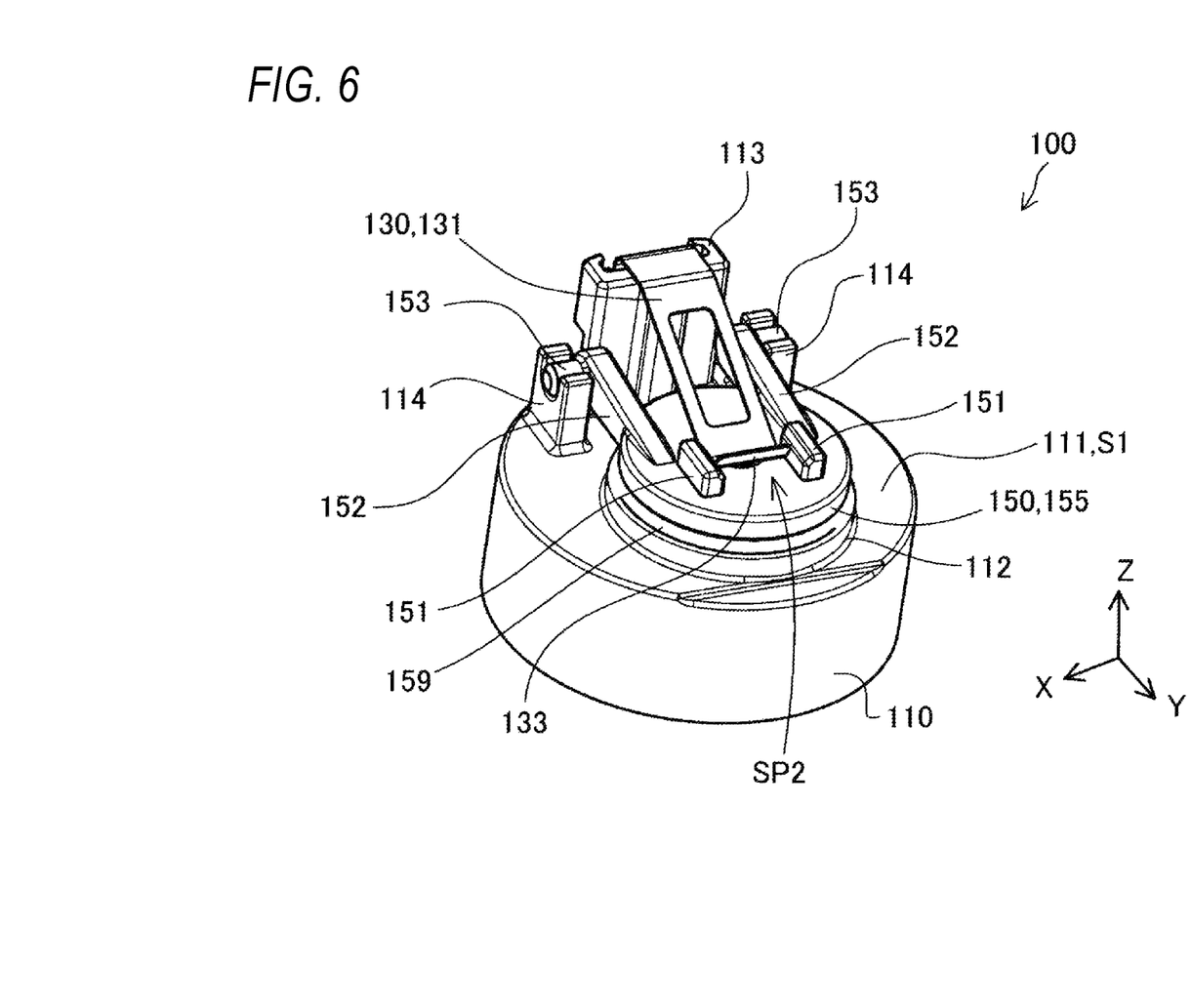
FIG. 6 is a perspective view showing a detailed configuration of the flap valve device.

FIGS. 5 and 6 are perspective views showing a detailed configuration of the flap valve device 100. FIG. 5 illustrates the engaging member 101 and the seal member 102 in addition to the flap valve device 100. The engaging member 101 has an annular external shape. As shown in FIG. 5, an engaging groove 103 is formed in an outer peripheral surface of the engaging member 101, and the engaging member 101 is engaged with −Z direction end portion of the valve accommodating portion 23 and +Z direction end portion of the first pipe connecting portion 21 by the engaging groove 103.

The flap valve device 100 includes a valve seat member 110, a valve body 150, and an elastic member 130. The valve seat member 110 has a bottom portion 111 in which an opening 112 is formed, and has a bottomed tubular external shape. In the valve closed state shown in FIGS. 3, 5, and 6, the opening 112 is sealed by the valve body 150. The bottom portion 111 is exposed to the valve accommodating space h3 on an outer side surface (+Z direction surface) as shown in FIG. 4, and is exposed to the first inner hole h1 on an inner side surface (surface in the −Z direction) as shown in FIG. 3.

Figure 7:
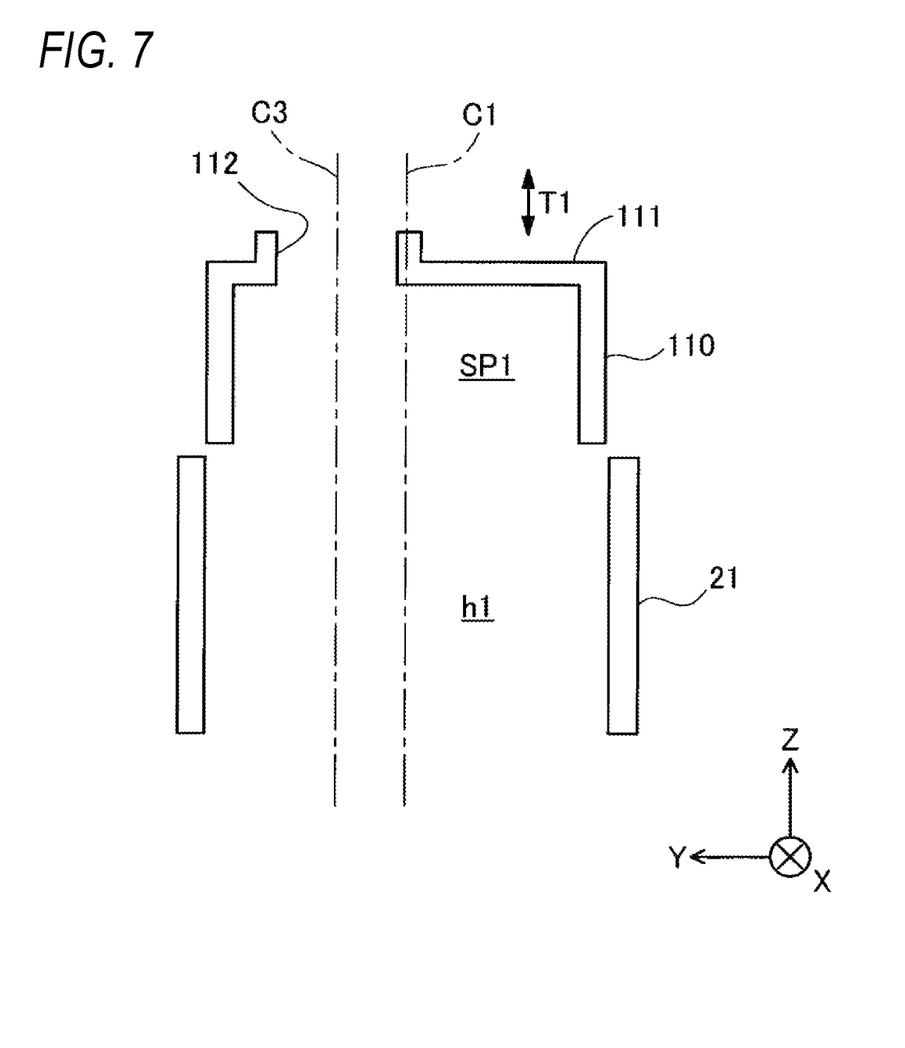
FIG. 7 is a diagram illustrating a positional relationship between a first central axis of a first pipe connecting portion and a third central axis of an opening.

FIG. 7 is a diagram illustrating a positional relationship between the first central axis C1 of the first pipe connecting portion 21 and the third central axis C3 of the opening 112. In FIG. 7, cross sections of the first pipe connecting portion 21 and the valve seat member 110 are schematically illustrated, and the second pipe connecting portion 22, the valve accommodating portion 23, the retainer 30, and the like are omitted. Further, in FIG. 7, a trajectory T1 of a position of a rotation axis when the valve body 150 pivots is indicated by a thick arrow. The valve body 150 rotates about a rotation axis parallel to the X-axis direction. The valve body 150 moves in the Z-axis direction according to a connection state with the joint 900. Therefore, the rotation axis of the valve body 150 moves along the trajectory T1 parallel to the Z-axis direction. Here, as shown in FIG. 7, the opening 112 is formed in the bottom portion 111 of the valve seat member 110 such that the central axis C3 of the opening 112 (hereinafter, referred to as "third central axis C3") is parallel to the central axis C1 of the first pipe connecting portion 21 and is located at a position farther from the rotation axis (trajectory T1) of the valve body 150 along a direction parallel to the Y-axis direction (direction parallel to the second central axis C2) than the first central axis C1. A reason for such positional deviation in the Y-axis direction between the first central axis C1 and the third central axis C3 will be described later. The "central axis C3 of the opening 112" means an axis that passes through a center of the opening 112 and coincides with a normal line when the opening 112 is regarded as a plane.

As shown in FIGS. 4 to 6, the valve seat member 110 includes, on the bottom portion 111, an elastic member support portion 113 and a pair of bearing portions 114 in addition to the opening 112. The bottom portion 111, the elastic member support portion 113, and the bearing portion 114 are integrally formed.

The elastic member support portion 113 is formed on −Y direction end portion on the +Z direction surface of the bottom portion 111. The elastic member support portion 113 has a rectangular columnar external shape protruding from the bottom portion 111 in the +Z direction. The elastic member support portion 113 supports the elastic member 130. In the present embodiment, the elastic member 130 is implemented by a bent plate spring. The elastic member support portion 113 fixes one end portion 132 of the plate spring. In this way, the elastic member support portion 113 allows the one end portion 132 of the elastic member 130 to function as a fixed end.

The pair of bearing portions 114 are formed on the −Y direction end portion on the +Z direction surface of the bottom portion 111 so as to sandwich the elastic member support portion 113 in the X-axis direction. The bearing portions 114 pivotally support a pair of shaft portions 153 of the valve body 150. However, in the present embodiment, in a normal state, the bearing portions 114 and the shaft portions 153 are not in contact with each other, and the shaft portions 153 are located on +Z direction side of the bearing portions 114 and are not in contact with the bearing portions 114. Accordingly, in the normal state, the bearing portions 114 merely function to restrict the shaft portions 153 from being excessively displaced in position when the valve body 150 pivots. However, even in an abnormal state in which a position of the shaft portion 153 is located on the −Z direction side of an expected position due to a design tolerance, an assembly error, or the like of a seal portion 159 of the valve body 150, since there is a gap between the shaft portion 153 and the bearing portion 114 in the normal state, the bearing portion 114 can pivotally support the shaft portion 153.

Figure 8:
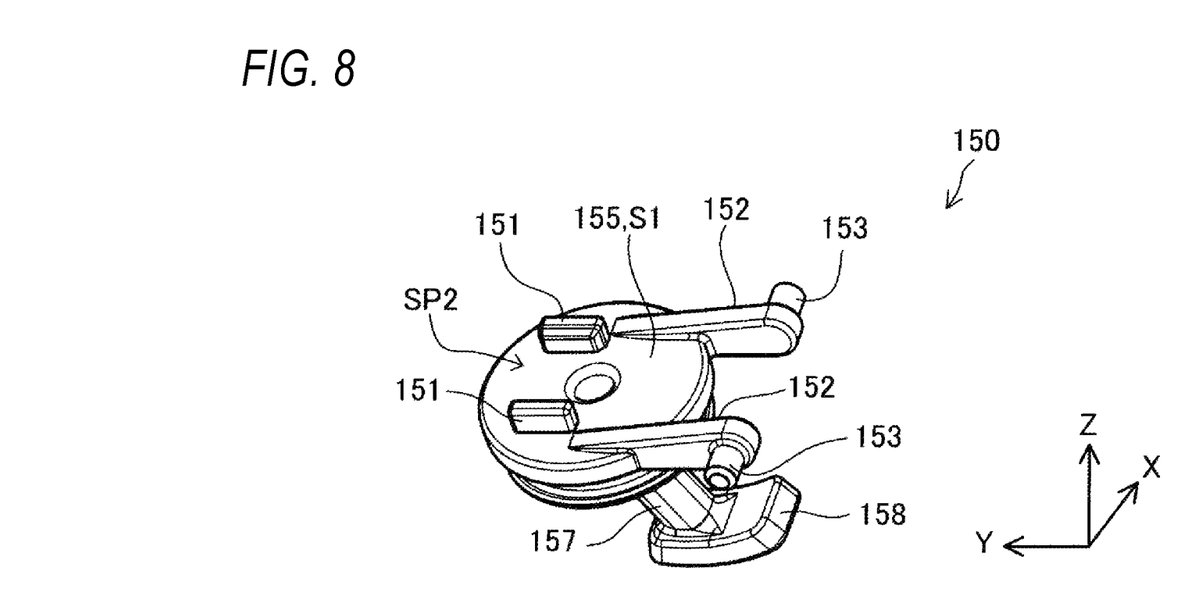
FIG. 8 is a perspective view showing a detailed configuration of a valve body.
Figure 9:
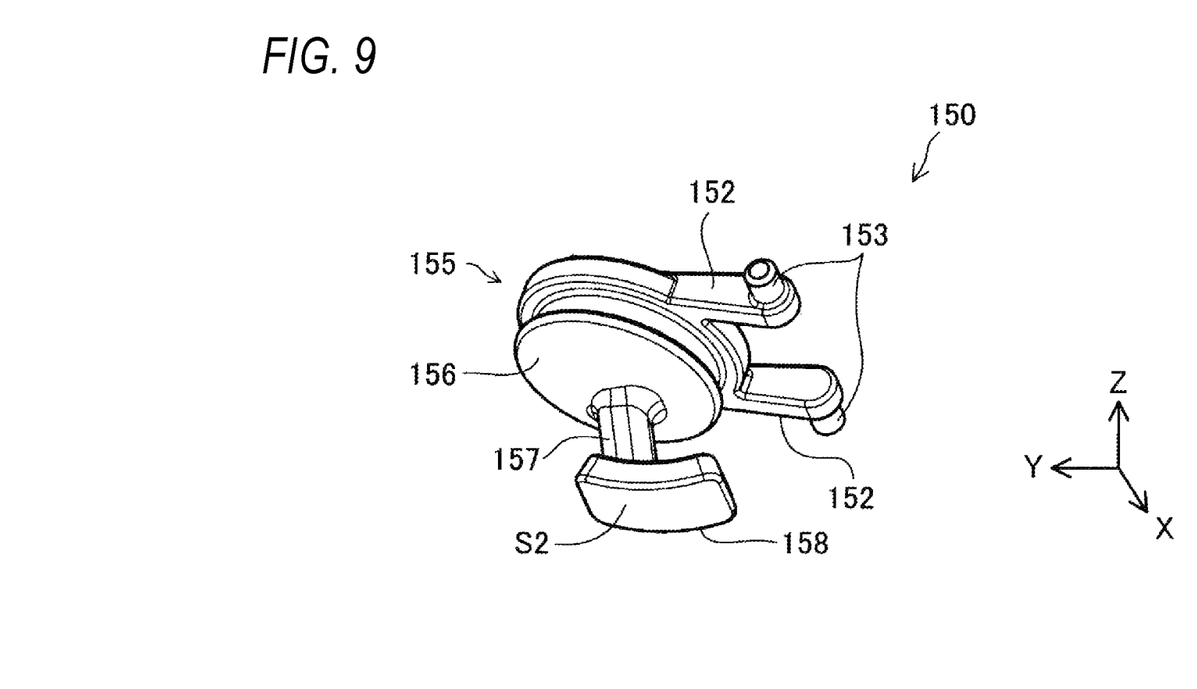
FIG. 9 is a perspective view showing a detailed configuration of the valve body.

FIGS. 8 and 9 are perspective views showing a detailed configuration of the valve body 150. The valve body 150 is configured to pivot about a rotation axis that moves along the trajectory T1 shown in FIG. 7 when the valve body 150 is connected to the joint 900 and is orthogonal to both the first central axis C1 and the second central axis C2. The valve body 150 achieves a valve closed state by sealing the opening 112 of the bottom portion 111, and achieves a valve open state by opening the opening 112.

In addition to the pair of shaft portions 153, the valve body 150 includes a main body portion 155, a pair of elastic member guide portions 151, a pair of support arm portions 152, a protruding portion 157, a pressing portion 158, and the seal portion 159. In FIGS. 8 and 9, the seal portion 159 is omitted. In FIGS. 5 and 6 described above, the seal portion 159 is shown.

The main body portion 155 has a thin cylindrical external shape in which one end surface (hereinafter, referred to as an "exposed surface 156") is formed in a conical shape. In the valve open state, the exposed surface 156 is a surface on which a cooling medium flowing in from the first pipe connecting portion 21 and flowing through the first inner hole h1 toward the +Z direction collides in the valve accommodating space h3. Since the exposed surface 156 has a conical shape, the cooling medium colliding with the exposed surface 156 can be oriented toward the second inner hole h2. As shown in FIG. 4, in the valve closed state, a central axis direction (thickness direction) of the main body portion 155 is parallel to the Z-axis. As shown in FIG. 4, in the valve closed state, the exposed surface 156 is exposed to an inner space SP1 of the valve seat member 110.

As shown in FIG. 8, the pair of elastic member guide portions 151 are provided apart from each other by a predetermined distance in the X-axis direction on a surface opposite to the exposed surface 156, that is, a surface S1 which is +Z direction end surface of the main body portion 155. The pair of elastic member guide portions 151 each have a substantially quadrangular prism external shape and protrude from the surface S1 in the +Z direction. As shown in FIGS. 5 and 6, a folded portion 133 of the elastic member 130 is disposed in a region SP2 between the pair of elastic member guide portions 151 on the surface S1. A length of the region SP2 in the X-axis direction is longer than a length of the folded portion 133 in the X-axis direction.

Here, a configuration of the elastic member 130 will be described. As described above, the elastic member 130 is implemented by a bent plate spring, and the −Y direction end portion 132 is fixed by the elastic member support portion 113. The elastic member 130 includes, in addition to the end portion 132, an intermediate portion 131 continuous with the end portion 132 and the folded portion 133 continuous with the intermediate portion 131 and located at an end opposite to the end portion 132. As described above, the end portion 132 is the fixed end, while the intermediate portion 131 and the folded portion 133 are released. That is, the intermediate portion 131 and the folded portion 133 are not fixed to the valve body 150 or the valve seat member 110, and are deformable and movable in response to an applied stress. A +Z direction end portion of the elastic member support portion 113 substantially coincides with the +Z direction end portion of the end portion 132. The +Z direction end portions of the elastic member support portion 113 and the end portion 132 are located on +Z direction side of the surface S1. Accordingly, as shown in FIGS. 5 and 6, the intermediate portion 131 continuous with the end portion 132 and the folded portion 133 is disposed obliquely so as to be positioned in the −Z direction as extending toward the +Y direction. As shown in FIGS. 5 and 6, the intermediate portion 131 is provided with an opening to achieve reduction in weight and reduction in urging force. As shown in FIGS. 4 to 6, the folded portion 133 is bent so as to form an inclined surface opposite to the intermediate portion 131 with a portion in contact with the surface S1 of the valve seat member 110 (bottom portion 111) as a boundary. When the valve open state and the valve closed state are switched, the released folded portion 133 moves to slide on the surface S1 such that a position in contact with the surface S1 changes. Further, the pair of elastic member guide portions 151 restrict the folded portion 133 from being excessively displaced in the X-axis direction and being deviated from the region SP2 during the movement.

As shown in FIGS. 8 and 9, the pair of support arm portions 152 each have a thin plate external shape having a substantially triangular shape in plan view. The pair of support arm portions 152 are provided apart from each other by a predetermined distance in the X-axis direction. +Y direction end portions of the pair of support arm portions 152 are provided to be continuous with the bottom portion 111, and −Y direction end portions are disposed away from the bottom portion 111. In the pair of support arm portions 152, the pair of shaft portions 153 are provided on end portions at a side away from the bottom portion 111. Accordingly, as shown in FIGS. 5 and 6, in an assembled state, the pair of support arm portions 152 support the valve body 150 in a cantilever manner when the shaft portions 153 are supported by the bearing portions 114.

As shown in FIGS. 8 and 9, the protruding portion 157 has a rod-shaped external shape, protrudes from the exposed surface 156, and is continuous with the pressing portion 158 at a tip end thereof. The pressing portion 158 has a curved plate-shaped external shape. A surface S2 (hereinafter, referred to as a "contact surface S2") of the pressing portion 158 opposite to a surface continuous with the tip end of the protruding portion 157 in a thickness direction comes into contact with the joint 900 (the abutting portion 921) when the joint 900 is connected.

The contact surface S2 is a curved surface which is a set of involute curves. In other words, the contact surface S2 is a curved surface whose cross section is an involute curve. The involute curve is a flat curved surface whose normal line is normally in contact with one fixed circle. The reason why the contact surface S2 is a curved surface whose cross-sectional shape is an involute curve will be described later.

A3: Coupling and Removing Operations Between Joint Members

Figure 10:
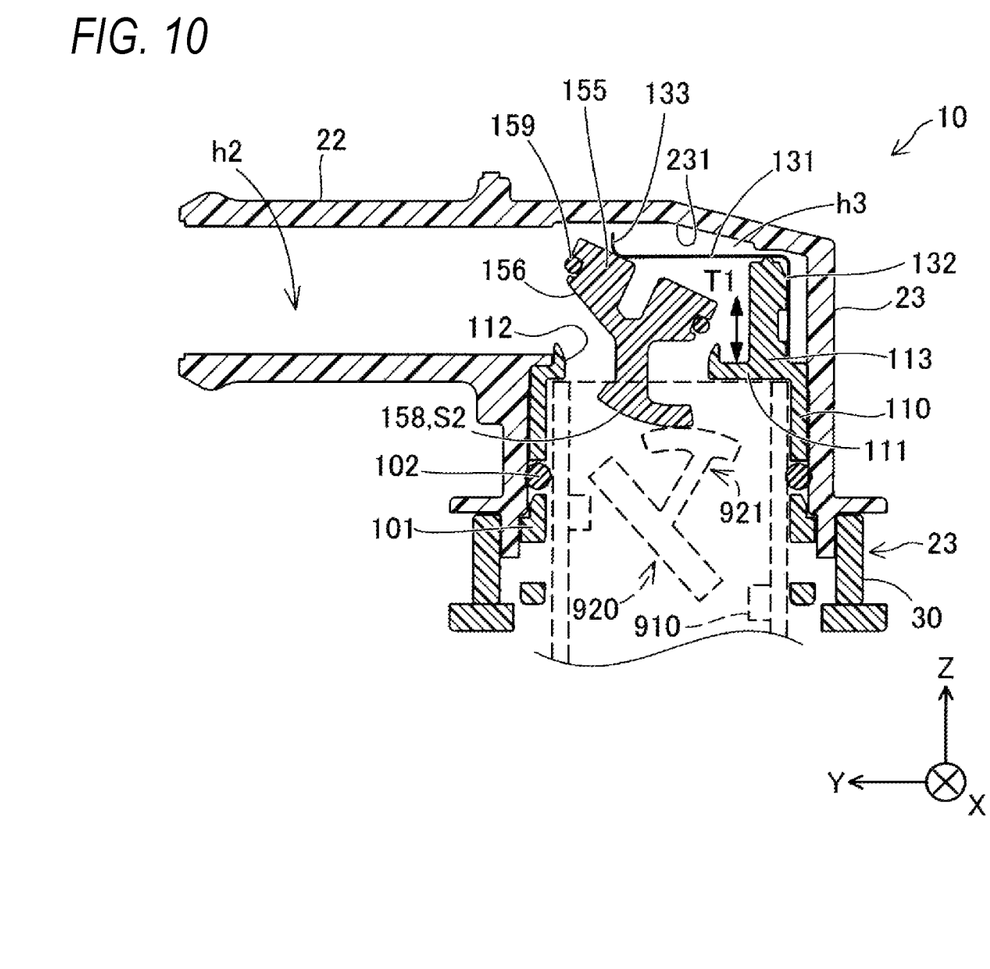
FIG. 10 is a cross-sectional view showing a cross section of the elbow pipe joint.

FIG. 10 is a cross-sectional view showing a cross section of the elbow pipe joint 10. As in FIG. 4, FIG. 10 shows a cross section taken along the line IV-IV of FIG. 1. FIG. 10 illustrates the elbow pipe joint 10 in a state in which the joint 900 is connected to the first pipe connecting portion 21, that is, in a valve closed state.

When the joint 900 moves in the +Z direction from the valve open state shown in FIG. 4 and is inserted into the first inner hole h1, and the tip end of the joint 900 abuts on the bottom portion 111 of the valve seat member 110 as shown in FIG. 10, the insertion of the joint 900 is stopped, a worker attaches the retainer 30 to the first pipe connecting portion 21, and the connection between the elbow pipe joint 10 and the joint 900 is completed.

During the insertion of the joint 900, the abutting portion 921 of the flap valve 920 of the joint 900 comes into contact with the contact surface S2 of the pressing portion 158 of the valve body 150. Thereafter, as the insertion of the joint 900 proceeds, the abutting portion 921 accordingly presses the pressing portion 158 in the +Z direction. Here, in the present embodiment, a tip end surface of the abutting portion 921 of the joint 900 also has an involute curve as the contact surface S2. Therefore, as the abutting portion 921 presses the pressing portion 158, a contact portion between the abutting portion 921 and the pressing portion 158 is displaced in the abutting portion 921 and the seal portion 159. That is, a portion of the contact surface S2 that is in contact with the abutting portion 921 is displaced in a curved shape along a longitudinal direction of the contact surface S2. Accordingly, the valve body 150 pivots about the shaft portions 153. At this time, the valve body 150 is pressed and displaced in the +Z direction as a whole due to the pressing from the abutting portion 921. Accordingly, as shown in FIG. 10, the opening 112 is opened, and the first inner hole h1, the second inner hole h2, and the valve accommodating space h3 communicate with one another through the opening 112.

At this time, in the joint 900, the flap valve 920 also pivots to open the opening of the seal portion 910, and the inner hole of the joint 900 and the first inner hole h1 communicate with each other. At this time, as a flow path of the cooling medium connecting the first inner hole h1, the valve accommodating space h3, and the second inner hole h2, a flow path that passes through a gap generated in the +Y direction with respect to the valve body 150 is formed in the opening 112. The flow path is a flow path that connects the first inner hole h1 and the second inner hole h2 at a shortest distance. Therefore, the pressure loss can be reduced. As shown in FIG. 10, the valve body 150 pivots and moves in the +Z direction as compared with that in the valve closed state shown in FIG. 4. Accordingly, as a flow path of the cooling medium connecting the first inner hole h1, the valve accommodating space h3, and the second inner hole h2, a flow path passing through a gap generated in the −Y direction with respect to the valve body 150 is also formed in the opening 112. This flow path is a flow path that passes between the valve body 150 and the elastic member support portion 113 and further goes around a side of the elastic member 130 or passes through the opening of the elastic member 130 to the second inner hole h2. Here, as shown in FIGS. 4 and 10, in the valve accommodating portion 23, an inner wall 231 of +Z direction and −Y direction end portion is formed as an inclined surface whose normal direction is substantially the −Z direction and the +Y direction. In other words, the inner wall of the valve accommodating portion 23 is formed to be chamfered. Accordingly, in the valve open state shown in FIG. 10, the flow path passing through the elastic member 130 can be made compact, and the pressure loss can be reduced by shortening the flow path.

As illustrated in FIGS. 4 and 10, when viewed in the +Z direction, the pressing portion 158 is provided on a side of the valve body 150 closer to the rotation axis (trajectory T1) in a direction parallel to the second central axis C2 and the Y axis. The "side . . . closer to the rotation axis in a direction parallel to the second central axis C2 and the Y axis" means a side closer to the rotation axis when the valve body 150 is divided into two parts in the direction parallel to the Y-axis direction. As described above, since the pressing portion 158 is provided at the side closer to the rotation axis in the valve body 150 when viewed in the +Z direction, the valve body 150 is pressed in the +Z direction by the joint 900 at the side closer to the rotation axis. Therefore, as compared with a configuration in which the pressing portion 158 is provided on a side far from the rotation axis, the valve body 150 can be rotated at a larger angle when the valve body 150 is pressed by the joint 900 (the abutting portion 921) in the +Z direction by the same length along the first central axis C1. Accordingly, a flow path cross-sectional area of the cooling medium in the vicinity of the valve body 150 in the valve accommodating space h3 can be increased, and the pressure loss can be further reduced.

In order to provide the pressing portion 158 at the side closer to the rotation axis in the direction parallel to the second central axis C2 and the Y axis, in the present embodiment, an installation manner of the protruding portion 157 and the pressing portion 158 is adjusted. Specifically, as shown in FIG. 4, the protruding portion 157 is formed to extend in the −Y direction and the −Z direction from a center of the valve body 150 (exposed surface 156) in the valve closed state. Therefore, the pressing portion 158 (contact surface S2) provided at the tip end of the protruding portion 157 is located at the side closer to the rotation axis in the direction parallel to the second central axis C2 and the Y axis when viewed in the +Z direction.

Further, in order to press the valve body 150 in the +Z direction from the joint 900 at the side closer to the rotation axis, a "positional deviation in the Y-axis direction between the first central axis C1 of the first inner hole h1 and the third central axis C3 of the opening 112" described with reference to FIG. 7 is formed. Specifically, the opening 112 is formed in the bottom portion 111 of the valve seat member 110 such that the third central axis C3 of the opening 112 is located at a position far from the rotation axis along the direction parallel to the second central axis C2 and the Y axis. Therefore, a central axis of the valve body 150 that seals the opening 112 is located at a position farther from the rotation axis (trajectory T1) along the Y-axis direction than the first central axis C1 in the valve closed state. On the other hand, the joint 900 is inserted into the first inner hole h1 such that the central axis thereof coincides with the first central axis C1 of the first inner hole h1. Therefore, in the valve closed state, the pressing portion 158 is pressed by the joint 900 in the +Z direction at the side closer to the rotation axis of the valve body 150.

Since the contact surface S2 of the pressing portion 158 of the valve body 150 is a curved surface which is a set of involute curves, when the contact surface S2 comes into contact with the abutting portion 921 and is pressed in the +Z direction, the contact portion moves along the curved surface, and the valve body 150 can be pivoted. Further, a position of the contact portion at this time can be prevented from being excessively displaced in the X-axis direction and the Y-axis direction, and the valve body 150 can be smoothly pivoted. In the present embodiment, a surface of the abutting portion 921 of the joint 900 that comes into contact with the contact surface S2 is also a curved surface that is a set of involute curves, and a longitudinal direction of the curved surface and a longitudinal direction of the contact surface S2 coincide with each other in the Y-axis direction when viewed in the Z-axis direction, and thus the contact portion between the pressing portion 158 and the abutting portion 921 is linear. Therefore, a larger pressure can be applied to the valve body 150 than in a configuration in which the valve body 150 makes a surface contact. As shown in FIG. 10, in the valve open state, the protruding portion 157 is disposed parallel to the first central axis C1. In other words, the protruding portion 157 is disposed such that a central axis thereof is parallel to the first central axis C1 of the first inner hole h1. Therefore, an area of the protruding portion 157 as viewed in the Z-axis direction can be reduced. Accordingly, the pressure loss of the cooling medium flowing through the first inner hole h1 in the +Z direction and flowing into the valve accommodating space h3 can be reduced.

The elbow pipe joint 10 of the embodiment described above includes the first pipe connecting portion 21 and the second pipe connecting portion 22 which have the central axes (the first central axis C1 and the second central axis C2) intersecting each other, the valve accommodating portion 23, and the flap valve device 100 accommodated in the valve accommodating portion 23 and pivoting to switch between the valve open state and the valve closed state, so that even in a situation where only a narrow space can be secured in a direction along the first central axis C1 and a direction along the second central axis C2, the opening and closing operations of the valve (flap valve device 100) can be implemented. Therefore, coupling and removing of the joint members (the elbow pipe joint 10 and the joint 900) associated with the opening and closing operations of the valve can be implemented in a narrow environment. In addition, in the valve open state, the first inner hole h1 and the second inner hole h2 can communicate with each other in a shorter distance in the valve accommodating space h3 than in a plunger valve, so that the flow path resistance (pressure loss) can be reduced.

Further, the flap valve device 100 includes the valve seat member 110 having a bottomed tubular shape and including the bottom portion 111 in which the opening 112 is formed, the valve body 150, and the elastic member 130, so that in a state in which the joint 900 is not connected to the elbow pipe joint 10, the valve body 150 is urged by the elastic member 130 to seal the opening 112, thereby implementing the valve closed state, and on the other hand, in a state in which the joint 900 is connected to the elbow pipe joint 10, the valve body 150 pivots to open the opening 112, thereby implementing the valve open state.

Further, since the pressing portion 158 is provided on the valve body 150 at the side closer to the rotation axis of the valve body 150, at the time of pivoting, in the direction parallel to the second central axis C2, the valve body 150 can be pivoted at a larger angle when the pressing portion 158 is pressed by the joint 900 by the same length along the first central axis C1, as compared with a configuration in which the pressing portion 158 is provided on a side far from the rotation axis. Accordingly, the flow path cross-sectional area in the valve accommodating space h3 can be further increased, and the pressure loss can be further reduced.

Further, since the opening 112 is formed in the bottom portion 111 of the valve seat member 110 such that the third central axis C3 of the opening 112 is parallel to the first central axis C1 and is positioned on a side farther from the rotation axis along the direction parallel to the second central axis C2 than the first central axis C1, the pressing portion 158 provided on the valve body 150 at the side closer to the rotation axis in the direction along the second central axis C2 can be pressed with higher accuracy in a configuration when the joint 900 is connected to the first pipe connecting portion 21, the joint 900 is connected with the central axis thereof coincides with the first central axis C1, and presses the pressing portion 158 with a portion on the central axis of the joint 900 (the abutting portion 921).

Further, since the valve body 150 includes the rod-shaped protruding portion 157 protruding from the exposed surface 156 and continuous with the pressing portion 158 at the tip end thereof, when the joint 900 is connected to the first pipe connecting portion 21, a portion of the valve body 150 different from the pressing portion 158 can be prevented from being pressed.

Further, since the protruding portion 157 is disposed parallel to the first central axis C1 in the valve open state, the area of the protruding portion 157 when viewed in the direction of the first central axis C1 can be reduced. Therefore, the pressure loss of the cooling medium when the cooling medium flows into the valve accommodating space h3 from the first inner hole h1 can be reduced.

Further, since the contact surface S2 of the pressing portion 158 in contact with the joint 900 is implemented by a curved surface which is a set of involute curves, a contact position between the joint 900 and the pressing portion 158 can be prevented from being excessively displaced, and since the contact portion can be a line, a pressing force can be stably transmitted to the valve body 150 at the time of connection of the joint 900. Therefore, the valve body 150 can be smoothly pivoted, and the valve body 150 can be pivoted with a small force.

B. Other Embodiments (B1) In the above-described embodiment, the first pipe connecting portion 21, the second pipe connecting portion 22, and the valve accommodating portion 23 are integrally formed, but at least may be partially formed to be separated.

(B2) In the above-described embodiment, the elastic member 130 is implemented by a plate spring, but is not limited to the plate spring, and may be implemented by a member having any kind of elasticity capable of urging the valve body 150, such as a cylindrical member formed of a coil spring or an elastic material.

(B3) In the above-described embodiment, the valve seat member 110 may be omitted. Specifically, for example, the valve accommodating portion 23 may have a structure in which a plate-shaped partition wall crossing the valve accommodating space h3 is provided therein, an opening may be provided in the partition wall, and the valve body 150 may seal or open the opening. In such a configuration, the same effects as those of the elbow pipe joint 10 of the embodiment are also achieved.

(B4) In the above-described embodiment, at least one of the contact surface S2 and the tip end surface of the abutting portion 921 may be a curved surface which is a part of a spherical surface instead of a curved surface that is a set of involute curves. Further, at least one of the contact surface S2 and the tip end surface of the abutting portion 921 may be a flat surface. In such a configuration, the abutting portion 921 can also press the pressing portion 158 in the +Z direction, and the pressing portion 158 can also receive a force from the joint 900. Further, a pipe connected to the first central axis C1 may be, for example, a pipe including a rod-shaped protruding portion protruding in the +Z direction at a tip end portion thereof, instead of the joint 900. In such a configuration, when the pipe is connected to the first central axis C1, the protruding portion of the pipe can press the pressing portion 158 in the +Z direction to open the valve.

(B5) The elbow pipe joint 10 of the above-described embodiment is merely an example, and can be variously modified. For example, the pressing portion 158 may be provided on the valve body 150 on a side far from the rotation axis or at a central position in the direction parallel to the second central axis C2 (Y axis). Further, the protruding portion 157 may be omitted from the valve body 150. In such a configuration, for example, the exposed surface 156 may be formed of a curved surface which is a set of involute curves, and the exposed surface 156 may be pressed by the joint 900. In such a configuration, the exposed surface 156 coincides with the pressing portion 158 and the contact surface S2. Further, the pressing portion 158 may not be parallel to the first central axis C1 but intersect the first central axis C1 in the valve open state. Further, the protruding portion 157 may intersect the first central axis C1 in the valve open state.

The present disclosure is not limited to the above-described embodiments, and can be implemented by various configurations without departing from the gist of the present disclosure. For example, the technical features in each embodiment corresponding to the technical features in the aspects described in the summary of the invention can be replaced or combined as appropriate in order to solve a part or all of the above-described problems or in order to achieve a part or all of the above-described effects. Further, unless the technical features are described as being essential in the present specification, the technical features can be appropriately deleted.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An elbow pipe joint, comprising:
    a first pipe connecting portion having a tubular shape, and configured to allow another joint to be connected;
    a second pipe connecting portion having a tubular shape, and having a second central axis intersecting a first central axis of the first pipe connecting portion;
    a valve accommodating portion having a hollow shape, connected to the first pipe connecting portion and the second pipe connecting portion, and having a valve accommodating space that communicates with a first inner hole of the first pipe connecting portion and a second inner hole of the second pipe connecting portion; and
    a flap valve device accommodated in the valve accommodating portion, and configured to pivot to switch between a valve open state in which the first inner hole and the second inner hole communicate with each other and a valve closed state in which the first inner hole and the second inner hole are blocked from each other,
    wherein the flap valve device includes:
        a valve seat member having a bottomed tubular shape, including a bottom portion in which an opening is formed, and having a central axis parallel to the first central axis, the bottom portion being disposed to be in contact with the valve accommodating space;
        a valve body configured to pivot about a rotation axis orthogonal to both the first central axis and the second central axis, the valve body implementing the valve closed state by sealing the opening, and implementing the valve open state by opening the opening; and
        an elastic member configured to urge the valve body to seal the opening,
    wherein the valve body includes a pressing portion exposed to an inner space of the valve seat member, which communicates with the first inner hole in the valve closed state, the pressing portion being pressed in a direction parallel to the first central axis by the another joint inserted into the first inner hole and connected to the first pipe connecting portion,
    wherein the pressing portion is provided on the valve body at a side closer to the rotation axis in a direction parallel to the second central axis, and
    wherein the opening is formed in the bottom portion such that a third central axis of the opening is parallel to the first central axis, and is positioned farther from the rotation axis along the direction parallel to the second central axis than the first central axis.

2. An elbow pipe joint, comprising:
    a first pipe connecting portion having a tubular shape, and configured to allow another joint to be connected;
    a second pipe connecting portion having a tubular shape, and having a second central axis intersecting a first central axis of the first pipe connecting portion;
    a valve accommodating portion having a hollow shape, connected to the first pipe connecting portion and the second pipe connecting portion, and having a valve accommodating space that communicates with a first inner hole of the first pipe connecting portion and a second inner hole of the second pipe connecting portion; and a flap valve device accommodated in the valve accommodating portion, and configured to pivot to switch between a valve open state in which the first inner hole and the second inner hole communicate with each other and a valve closed state in which the first inner hole and the second inner hole are blocked from each other, wherein the flap valve device includes:
- a valve seat member having a bottomed tubular shape, including a bottom portion in which an opening is formed, and having a central axis parallel to the first central axis, the bottom portion being disposed to be in contact with the valve accommodating space;
- a valve body configured to pivot about a rotation axis orthogonal to both the first central axis and the second central axis, the valve body implementing the valve closed state by sealing the opening, and implementing the valve open state by opening the opening; and
- an elastic member configured to urge the valve body to seal the opening, wherein the valve body includes a pressing portion exposed to an inner space of the valve seat member, which communicates with the first inner hole in the valve closed state, the pressing portion being pressed in a direction parallel to the first central axis by the another joint inserted into the first inner hole and connected to the first pipe connecting portion, wherein the pressing portion is provided on the valve body at a side closer to the rotation axis in a direction parallel to the second central axis, and wherein the valve body further includes:
- a main body portion including an exposed surface exposed to the inner space in the valve closed state, and a seal portion being continuous with the exposed surface and configured to seal the opening in the valve closed state; and
- a protruding portion having a rod shape, protruding from the exposed surface, and being continuous with the pressing portion at a tip end of the protruding portion.

3. The elbow pipe joint according to claim 2, wherein the protruding portion is disposed parallel to the first central axis in the valve open state.

4. An elbow pipe joint, comprising:
a first pipe connecting portion having a tubular shape, and configured to allow another joint to be connected;
a second pipe connecting portion having a tubular shape, and having a second central axis intersecting a first central axis of the first pipe connecting portion;
a valve accommodating portion having a hollow shape, connected to the first pipe connecting portion and the second pipe connecting portion, and having a valve accommodating space that communicates with a first inner hole of the first pipe connecting portion and a second inner hole of the second pipe connecting portion; and a flap valve device accommodated in the valve accommodating portion, and configured to pivot to switch between a valve open state in which the first inner hole and the second inner hole communicate with each other and a valve closed state in which the first inner hole and the second inner hole are blocked from each other, wherein the flap valve device includes:
- a valve seat member having a bottomed tubular shape, including a bottom portion in which an opening is formed, and having a central axis parallel to the first central axis, the bottom portion being disposed to be in contact with the valve accommodating space;
- a valve body configured to pivot about a rotation axis orthogonal to both the first central axis and the second central axis, the valve body implementing the valve closed state by sealing the opening, and implementing the valve open state by opening the opening; and
- an elastic member configured to urge the valve body to seal the opening, wherein the valve body includes a pressing portion exposed to an inner space of the valve seat member, which communicates with the first inner hole in the valve closed state, the pressing portion being pressed in a direction parallel to the first central axis by the another joint inserted into the first inner hole and connected to the first pipe connecting portion, wherein the pressing portion is provided on the valve body at a side closer to the rotation axis in a direction parallel to the second central axis, and wherein a contact surface, which is configured to come into contact with the another joint, of the pressing portion has a curve which is a set of involute curves.

\* \* \* \* \*